(12) United States Patent
Park et al.

(10) Patent No.: US 9,114,700 B2
(45) Date of Patent: Aug. 25, 2015

(54) HYBRID TRANSMISSION FOR VEHICLE

(71) Applicant: Hyundai Motor Company, Seoul (KR)

(72) Inventors: Jong Yun Park, Hwaseong-si (KR); Kyung Ha Kim, Yongin-si (KR); Ki Nam Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/276,541

(22) Filed: May 13, 2014

(65) Prior Publication Data

US 2015/0148167 A1    May 28, 2015

(30) Foreign Application Priority Data

Nov. 25, 2013    (KR) ........................ 10-2013-0144020

(51) Int. Cl.
  *B60K 6/48*       (2007.10)
  *B60K 6/547*      (2007.10)
  *B60K 6/365*      (2007.10)
  *F16H 61/688*     (2006.01)
  *B60W 20/00*      (2006.01)

(52) U.S. Cl.
  CPC ............... *B60K 6/547* (2013.01); *B60W 20/40* (2013.01); *Y10S 903/902* (2013.01)

(58) Field of Classification Search
  CPC .......... B60K 6/48; B60K 6/547; B60K 6/365; F16H 61/688
  See application file for complete search history.

(56) References Cited

U.S. PATENT DOCUMENTS

| 8,641,573  | B2 * | 2/2014  | Ideshio et al. ............... 475/218 |
| 8,777,789  | B2 * | 7/2014  | Potter ................................. 475/5 |
| 8,827,852  | B2 * | 9/2014  | Ikegami ............................ 475/5 |
| 8,888,636  | B2 * | 11/2014 | Ikegami et al. .................. 475/5 |
| 2012/0116629 | A1 * | 5/2012  | Kamoshida ..................... 701/22 |
| 2013/0068068 | A1 * | 3/2013  | Witt ................................. 74/661 |

FOREIGN PATENT DOCUMENTS

| JP | 2005-163927 A    | 6/2005 |
| JP | 2008-57655 A     | 3/2008 |
| JP | 2010-144775 A    | 7/2010 |
| JP | 2010-196745 A    | 9/2010 |
| KR | 10-2008-0058388 A | 6/2008 |

* cited by examiner

*Primary Examiner* — Tisha Lewis
(74) *Attorney, Agent, or Firm* — Morgan, Lewis & Bockius LLP

(57) ABSTRACT

A hybrid transmission of a vehicle may include a first input shaft receiving power from an engine through a first clutch, a second input shaft disposed substantially in parallel with the first input shaft and receiving power from the engine through a path different from the first input shaft, an output shaft disposed substantially in parallel with the first input shaft and the second input shaft, a common shift module including a plurality of shift gears and a plurality of synchronous apparatuses, a motor connected to the first input shaft, and first and second planetary gear apparatuses.

7 Claims, 3 Drawing Sheets

HYBRID TRANSMISSION FOR VEHICLE

CROSS REFERENCE TO RELATED APPLICATION

The present application claims priority of Korean Patent Application Number 10-2013-0144020 filed on Nov. 25, 2013, the entire contents of which application are incorporated herein for all purposes by this reference.

BACKGROUND OF INVENTION

1. Field of Invention

The present invention relates to a hybrid transmission for a vehicle, and more particularly, to a structure of a transmission which is configured to be more compact while minimizing the required number of shafts and parts.

2. Description of Related Art

A hybrid transmission which is used in a vehicle needs to be configured to reduce the required number of parts and a weight and to be compact, if possible, such that the hybrid transmission may be manufactured at low cost, improve fuel efficiency of a vehicle, and be easily mounted in the vehicle.

Further, as described above, the hybrid transmission needs to be configured to be able to implement shift stages as many as possible while being configured compactly due to the relatively small number of parts and the reduction in weight, such that an engine may be efficiently operated and fuel efficiency of a vehicle may be improved.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a hybrid transmission of a vehicle, in which the required number of parts, a weight, and a volume are reduced, if possible, to allow the transmission to be configured compactly, thereby easily mounting the transmission in the vehicle, reducing manufacturing costs of the transmission, and improving fuel efficiency of the vehicle and the number of shift stages which may be implemented is relatively increased, thereby much more improving the fuel efficiency of the vehicle.

According to various aspects of the present invention, there is provided a hybrid transmission for a vehicle including: a first input shaft which is mounted to receive power from an engine through a first clutch, a second input shaft which is disposed substantially in parallel with the first input shaft and mounted to receive power from the engine through a path different from the first input shaft, an output shaft which is disposed substantially in parallel with the first input shaft and the second input shaft, a common shift module configured to include a plurality of shift gears which are disposed at the first input shaft and/or the second input shaft to externally abut to the plurality of gears mounted at the output shaft in common and each forms one shift stage and a plurality of synchronous apparatuses which connects or disconnects each of the plurality of shift gears to or from the first input shaft or the second input shaft to form any one shift stage, a motor which is always connected to the first input shaft, a first planetary gear apparatus configured to connect a first rotating element of the first planetary gear apparatus to one shift gear mounted at the first input shaft, connect a second rotating element of the first planetary gear apparatus to the first input shaft, and convert a fixing state of a third rotating element of the first planetary gear apparatus, and a second planetary gear apparatus configured to connect a first rotating element of the second planetary gear apparatus to one shift gear mounted at the second input shaft, connect a second rotating element of the second planetary gear apparatus to the second input shaft, and convert a fixing state of a third rotating element of the second planetary gear apparatus.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
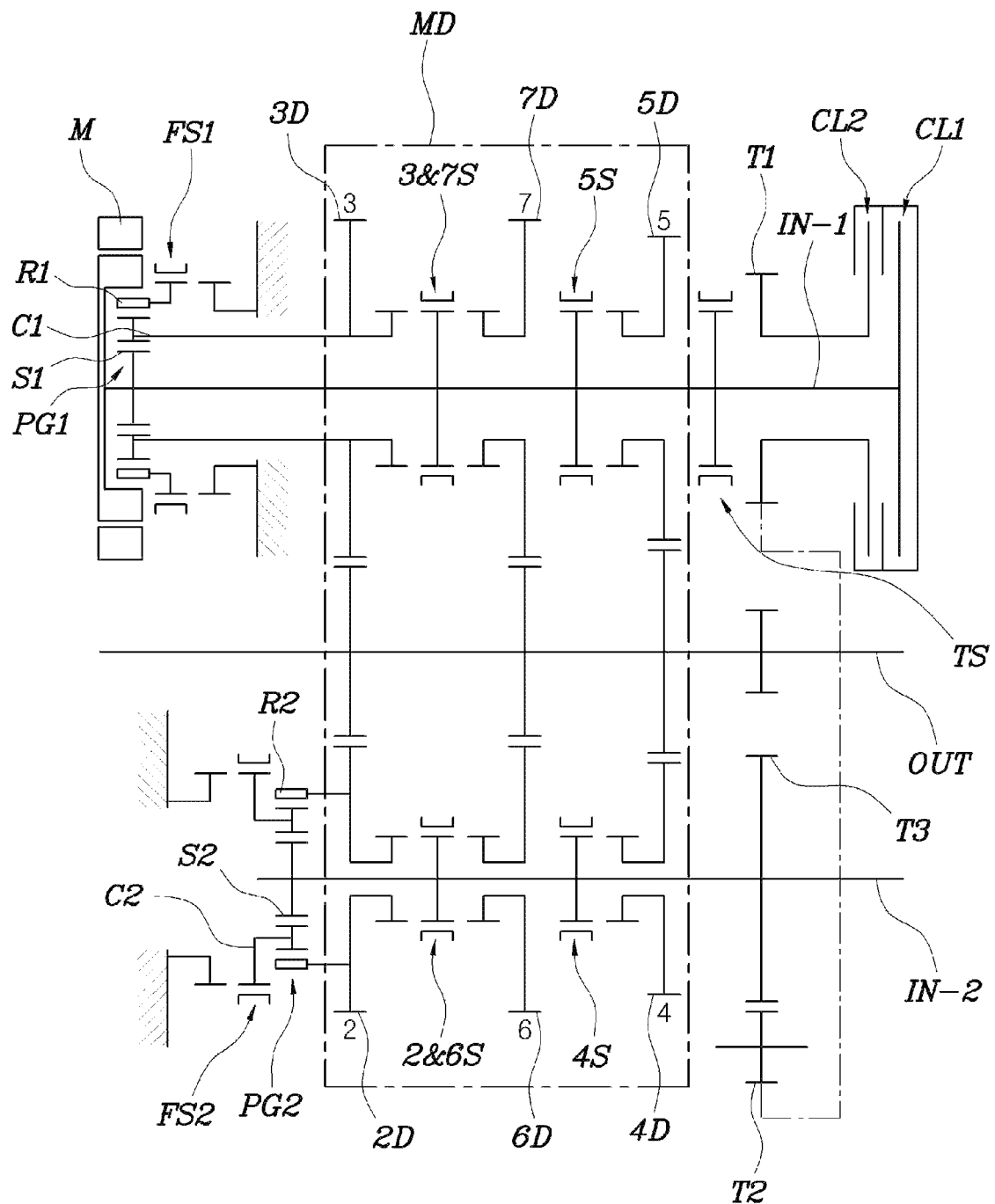
FIG. 1 is a configuration diagram illustrating an exemplary hybrid transmission of a vehicle according to the present invention.

Referring to FIG. 1, a hybrid transmission of a vehicle according to various embodiments of the present invention is configured to include a first input shaft IN-1 which is mounted to receive power from an engine through a first clutch CL1, a second input shaft IN-2 which is disposed in parallel or substantially in parallel with the first input shaft IN-1 and mounted to receive the power from the engine through a path different from the first input shaft IN-1, an output shaft OUT which is disposed in parallel or substantially in parallel with the first input shaft IN-1 and the second input shaft IN-2, a common shift module MD configured to include a plurality of shift gears which are disposed at the first input shaft IN-1 and/or the second input shaft IN-2 to externally abut to the plurality of gears mounted at the output shaft OUT in common and each form one shift stage and a plurality of synchronous apparatuses which connects or disconnects each of the plurality of shift gears to or from the first input shaft IN-1 or the second input shaft IN-2 so as to form any one shift stage, a motor M which is always connected to the first input shaft IN-1, a first planetary gear apparatus PG1 configured to connect the rotating elements to one shift gear mounted at the first input shaft IN-1 and the first input shaft IN-1 one by one and convert a fixing state of the other one rotating element, and a second planetary gear apparatus PG2 configured to connect the rotating elements to one shift gear mounted at the second input shaft IN-2 and the second input shaft IN-2 one by one and convert a fixing state of the other one rotating element.

That is, according to various embodiments of the present invention, the shift gears are meshed with each of the first input shaft IN-1 and the second input shaft IN-2 one by one in connection with one gear mounted at the output shaft OUT in the common shift module MD to form two different shift stages, such that the required of gears may be more reduced than in the case in which a pair of external gears forms one shift stage and the shift gears mounted at each input shaft one by one by using the first planetary gear apparatus PG1 and the second planetary apparatus PG2 are configured to be able to further implement another one shift stage, such that the required number of shafts and parts may be reduced and a relatively larger number of shift stages may be implemented, thereby providing the transmission which is configured to be compact and have the reduced weight and good mountability and greatly contributing to improvement in fuel efficiency of a vehicle.

According to various embodiments of the present invention, the shift gear of the first input shaft IN-1 connected to the first planetary gear apparatus PG1 and the shift gear of the second input shaft IN-2 connected to the second planetary gear apparatus PG2 are configured to be commonly meshed with one gear of the output shaft OUT.

Meanwhile, the second input shaft IN-2 is configured to receive power from the engine or the motor through a first transmission gear T1 configured to be mounted coaxially with the first input shaft IN-1 to receive the power from the engine through a second clutch CL2, a second transmission gear T2 configured to be meshed with the first transmission gear T1, and a third transmission gear T3 configured to be meshed with the second transmission gear T2 and integrally mounted at the second input shaft IN-2. One will appreciate that such integral components may be monolithically formed.

Further, the first input shaft IN-1 is provided with a transmission synchronous apparatus TS, which is a synchro mechanism, to be able to connect or disconnect the first transmission gear T1 to or from the first input shaft IN-1, thereby transmitting or blocking the power from the motor M, which is connected to the first input shaft IN-1, to or from the second input shaft IN-2.

Since odd stages among a series of shift stages are disposed between the first input shaft IN-1 and the output shaft OUT and even stages among the series of shift stages are disposed between the second input shaft IN-2 and the output shaft OUT, according to various embodiments of the present invention, the first input shaft IN-1 is provided with 3, 5, 7-stage shift gears and the second input shaft IN-2 is provided with 2, 4, 6-stage shift gears.

Further, the first input shaft IN-1 is provided with a 3 & 7-stage synchronous apparatus 3 & 7S configured to convert a state to connect or disconnect a 3-stage shift gear 3D or a 7-stage shift gear 7D to or from the first input shaft IN-1 and a 5-stage synchronous apparatus 5S configured to connect or disconnect the 5-stage shift gear 5D to or from the first input shaft IN-1 and the second input shaft IN-2 is provided with a 2 & 6-stage synchronous apparatus 2 & 6S configured to convert a state to connect or disconnect a 2-stage shift gear 2D or a 6-stage shift gear 6D to or from the second input shaft IN-2 and a 4-stage synchronous apparatus 4S configured to connect or disconnect a 4-stage shift gear 4D to or from the second input shaft IN-2.

The first planetary gear apparatus PG1 is configured to connect a first sun gear S1 to the first input shaft IN-1, connect a first carrier C1 to the 3-stage shift gear 3D, and fix a first ring gear R1 and the second planetary gear apparatus PG2 is configured to connect a second sun gear S2 to the second input shaft IN-2, connect a second ring gear R2 to the 2-stage shift gear 2D, and fix a second carrier C2.

The first ring gear R1 of the first planetary gear apparatus PG1 is fixedly mounted by a first fixing synchronous apparatus FS1 which is a synchro mechanism and the second carrier C2 of the second planetary gear apparatus PG2 is fixedly mounted by a second fixing synchronous apparatus FS2 which is a synchro mechanism.

Further, the first ring gear R1 and the second carrier C2 may be configured to convert the fixed state by a separate dry or wet brake, or the like.

Figure 2:
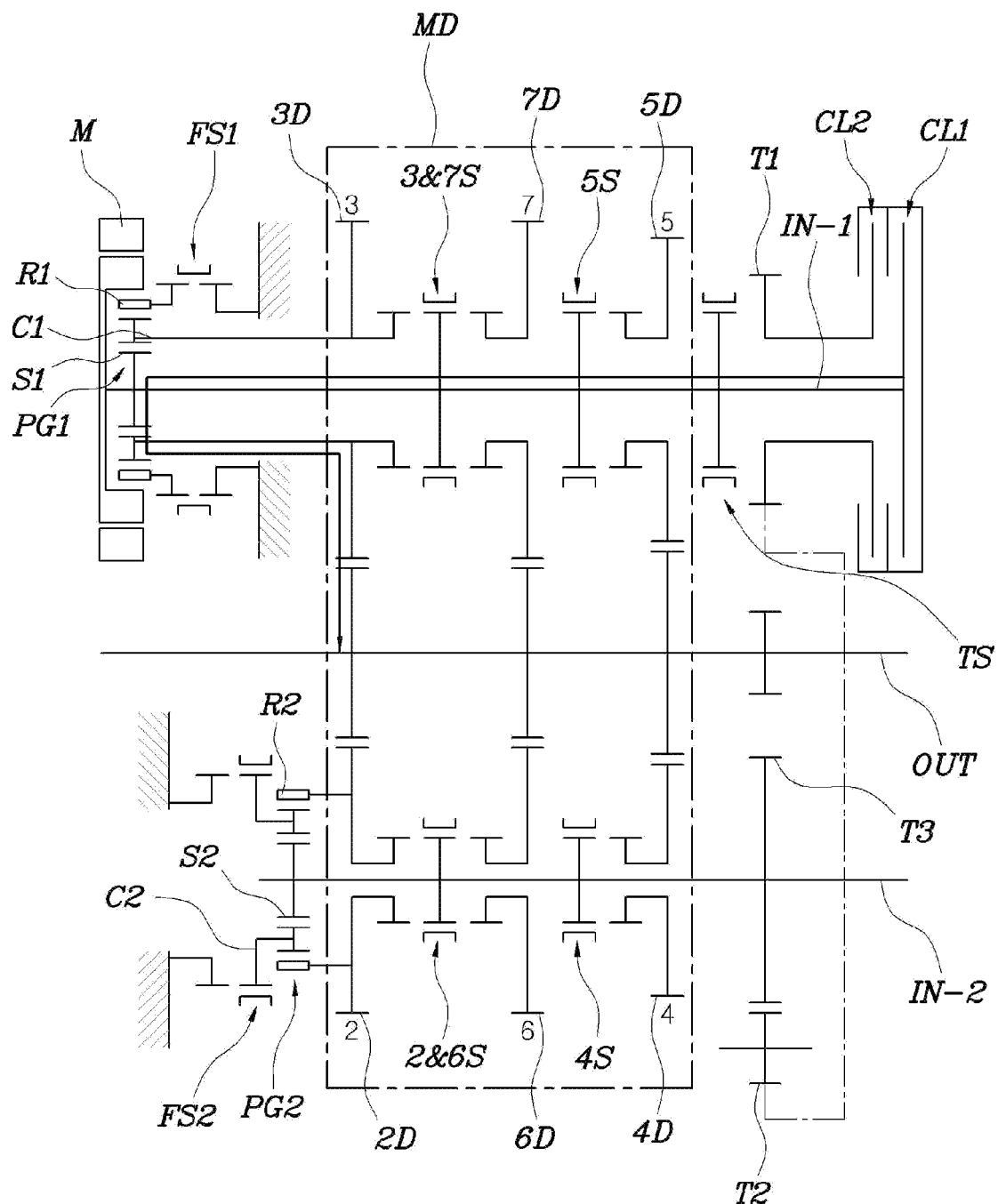
FIG. 2 is a diagram for describing the case in which the transmission of FIG. 1 implements a one-stage shift stage.

FIG. 2 is a diagram for describing the 1-stage implementation state of the transmission according to various embodiments of the present invention configured as described above. In the configuration of the present invention as described above, the 1-stage shift gear is not separately provided and the 3-stage shift gear 3D implements the 1-stage shift stage along with the first planetary gear apparatus PG1.

That is, when the first input shaft IN-1 is operated by power provided from the engine or the motor M in the state in which the first ring gear R1 is fixed by the first fixing synchronous apparatus FS1, a rotating power of the first sun gear S1 is reduced by the carrier and then is provided to the 3-stage shift gear 3D, such that an output from the 1 stage is drawn out to the output shaft OUT.

Further, when the 3-stage shift stage is implemented, the first fixing synchronous apparatus FS1 is disconnected and when the 3-stage shift gear 3D is connected to the first input shaft IN-1 by the 3 & 7-stage synchronous apparatuses 3 & 7S, an output from the 3 stage is drawn out to the output shaft OUT.

Figure 3:
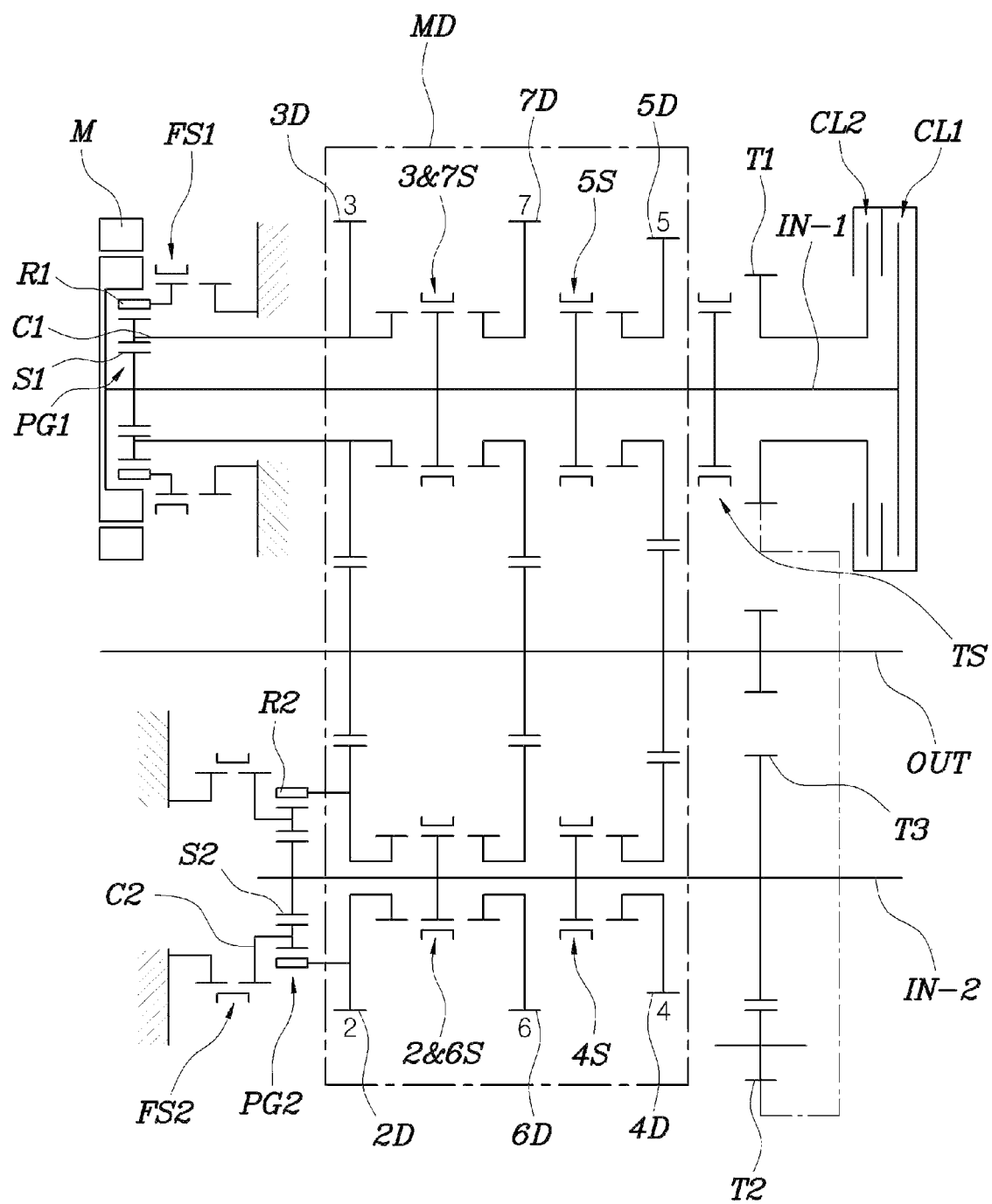
FIG. 3 is a diagram for describing the case in which the transmission of FIG. 1 implements an R-stage shift stage.

FIG. 3 is a diagram for describing a state in which an R stage which is a reverse stage is implemented and according to various embodiments of the present invention, the 2-stage shift gear 2D substantially performs a function of the R-stage shift gear along with the second planetary gear apparatus PG2.

That is, as illustrated in FIG. 3, when the second input shaft IN-2 rotates by the power from the engine in the state in which the second carrier C2 is fixed by the second fixing synchronous apparatus FS2, the rotating power of the second sun gear S2 integrally connected to the second input shaft IN-2 is reversed to the second ring gear R2 to drive the second shift gear, such that an output from the R stage is drawn out to the output shaft OUT. One will appreciate that such integral components may be monolithically formed.

Further, in order to implement the 2-stage shift stage, the 2-stage shift gear 2D is connected to the second input shaft IN-2 by the 2 & 6-stage synchronous apparatus 2 & 6S in the state in which the second carrier C2 is disconnected by the second fixing synchronous apparatus FS2, such that the output from the 2 stage in a forward direction is drawn out to the output shaft OUT.

According to various embodiments of the present invention, the required number of parts, the weight, and the volume may be reduced, if possible, so as to allow the transmission to be configured compactly, thereby easily mounting the transmission in the vehicle, reducing the manufacturing costs of the transmission, and improving the fuel efficiency of the vehicle and the number of shift stages which may be implemented may be relatively increased, thereby much more improving the fuel efficiency of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid transmission of a vehicle, comprising:
a first input shaft mounted to receive power from an engine through a first clutch;
a second input shaft configured to be disposed substantially in parallel with the first input shaft and mounted to receive power from the engine through a path different from the first input shaft;
an output shaft configured to be disposed substantially in parallel with the first input shaft and the second input shaft;
a common shift module configured to include a plurality of shift gears which are disposed at the first input shaft and/or the second input shaft to externally abut to a plurality of gears mounted at the output shaft in common and each forms one shift stage and a plurality of synchronous apparatuses which connects or disconnects each of the plurality of shift gears to or from the first input shaft or the second input shaft to form any one shift stage;
a motor configured to be always connected to the first input shaft;
a first planetary gear apparatus configured to connect a first rotating element of the first planetary gear apparatus to one shift gear mounted at the first input shaft, connect a second rotating element of the first planetary gear apparatus to the first input shaft, and convert a fixing state of a third rotating element of the first planetary gear apparatus; and
a second planetary gear apparatus configured to connect a first rotating element of the second planetary gear apparatus to one shift gear mounted at the second input shaft, connect a second rotating element of the second planetary gear apparatus to the second input shaft, and convert a fixing state of a third rotating element of the second planetary gear apparatus.

2. The hybrid transmission of a vehicle of claim 1, wherein the shift gear of the first input shaft connected to the first planetary gear apparatus and the shift gear of the second input shaft connected to the second planetary gear apparatus are configured to be commonly meshed with one gear of the output shaft.

3. The hybrid transmission of a vehicle of claim 1, wherein the second input shaft is configured to receive power from the engine or the motor through:
a first transmission gear configured to be mounted coaxially with the first input shaft to receive power from the engine through a second clutch;
a second transmission gear configured to be meshed with the first transmission gear; and
a third transmission gear configured to be meshed with the second transmission gear and integrally mounted at the second input shaft.

4. The hybrid transmission of a vehicle of claim 3, wherein the first input shaft is provided with a transmission synchronous apparatus, which is a synchro mechanism, to connect or disconnect the first transmission gear to or from the first input shaft.

5. The hybrid transmission of a vehicle of claim 1, wherein odd stages among a series of shift stages are disposed between the first input shaft and the output shaft, and
even stages among the series of shift stages are disposed between the second input shaft and the output shaft.

6. The hybrid transmission of a vehicle of claim 5, wherein the first planetary gear apparatus is configured to connect a first sun gear to the first input shaft, connect a first carrier to a 3-stage shift gear, and fix a first ring gear, and
the second planetary gear apparatus is configured to connect a second sun gear to the second input shaft, connect a second ring gear to a 2-stage shift gear, and fix a second carrier.

7. The hybrid transmission of a vehicle of claim 6, wherein the first ring gear of the first planetary gear apparatus is fixedly mounted by a first fixing synchronous apparatus which is a synchro mechanism, and
the second carrier of the second planetary gear apparatus is fixedly mounted by a second fixing synchronous apparatus which is a synchro mechanism.

* * * * *